United States Patent
Dimsa et al.

[11] Patent Number: 5,927,823
[45] Date of Patent: Jul. 27, 1999

[54] BACKUP CONTROL TECHNIQUE FOR 20 PIPE BRAKING SYSTEM

[75] Inventors: Robert D. Dimsa, Elizabeth; Vincent Ferri, Pittsburgh, both of Pa.

[73] Assignee: Westinghouse Air Brake Company, Wilmerding, Pa.

[21] Appl. No.: 08/831,461

[22] Filed: Mar. 31, 1997

[51] Int. Cl.[6] .................................................. B60T 15/14

[52] U.S. Cl. .................. 303/86; 303/15; 303/DIG. 3; 303/20; 303/16

[58] Field of Search ................ 303/15, 16, 81, 303/17, 86, 8, 20, 3, 25, DIG. 3, DIG. 4, 84.1, 84.2, 13, 14, 40, 28, DIG. 1, DIG. 2; 188/151 A

[56] References Cited

U.S. PATENT DOCUMENTS

| | | | |
|---|---|---|---|
| 5,192,118 | 3/1993 | Balukin et al. | 303/15 |
| 5,222,788 | 6/1993 | Dimsa et al. | 303/15 |
| 5,332,297 | 7/1994 | Cunkelman et al. | 303/15 |
| 5,358,315 | 10/1994 | Balukin | 303/15 |
| 5,503,469 | 4/1996 | Cunkelman | 303/15 |
| 5,662,391 | 9/1997 | McKay | 303/15 X |

*Primary Examiner*—Douglas C. Butler
*Attorney, Agent, or Firm*—James Ray & Associates

[57] ABSTRACT

In a microprocessor-controlled electro-pneumatic brake control system for a railway train, pressure in the brake cylinder is maintained despite the loss of pressure in the "20 pipe" brake line, or failure of a key relay valve that controls pressure to that brake line. Feedback signals derived from the "20 pipe" brake line when found to be inappropriate after a predetermined amount of time are substituted for by brake command signals generated by the brake controller.

10 Claims, 3 Drawing Sheets

5,927,823

BACKUP CONTROL TECHNIQUE FOR 20 PIPE BRAKING SYSTEM

CROSS REFERENCE TO RELATED APPLICATIONS

The invention taught in this patent application is related to the inventions taught in the following U.S. Patent Documents: U.S. Pat. No. 4,904,027, "Digital Air Brake Control System", issued Feb. 27, 1990; U.S. Pat. No. 5,192,118, "Electro-pneumatic Locomotive Brake Control System", issued Mar. 9, 1993; U.S. Pat. No. 5,222,788, "Microprocessor Based Electro-pneumatic Locomotive Brake Control System Having Brake Assurance Circuit"; issued Jun. 29, 1993; and, U.S. Pat. No. 5,503,469 issued Apr. 2, 1996, "Apparatus To Prevent Inadvertent Discharge And Trapping Of Pipe Pressure In An Electro-Pneumatic Locomotive Brake Control System", filed Jan. 30, 1995. Each of the above-referenced patent documents is assigned to the assignee of this invention. Additionally, the teachings of each of these patent documents are incorporated herein by reference thereto.

FIELD OF THE INVENTION

The present invention relates, in general, to a microprocessor-controlled electro-pneumatic type locomotive braking system and, more particularly, this invention relates to control processes for such systems.

BACKGROUND OF THE INVENTION

Modern-day locomotive controls, including the locomotive brake control system, incorporate computer technology to reduce hardware and to facilitate adaption of the system to various customer requirements.

In one such brake control system, a cab mounted, handle operated, brake command controller outputs the desired brake command signal to a microprocessor unit, which interprets the brake command signal in terms of a feedback signal indicative of the air pressure in an equalizer reservoir. The microprocessor then effects the operation of either the application or the release electro-pneumatic valve to adjust the equalizer reservoir pressure in accordance with the brake command signal.

Responsive to the aforementioned brake control circuit 4, as illustrated in FIG. 1, a high capacity pneumatic relay valve device 82 is employed to vary the trainline brake pipe pressure in accordance with variations of the pressure present in the equalizing reservoir 72, in order to control the railway car brakes. The aforementioned subsystem is called a brake pipe control circuit and its application to a locomotive brake control system is shown and described in the above-cited references, previously incorporated herein by reference.

The brake control system further includes an automatic brake control circuit 6, as illustrated in FIG. 1, having each of electro-pneumatic application and release valves 60 and 70, as well as an independent brake control circuit 8, illustrated also in FIG. 1, which includes additional electro-pneumatic application and release valves. The automatic brake control system is primarily intended for use when a train consist is made-up, for applying the brakes to all cars as well as the locomotives therein.

In contrast thereto, the independent brake control system is primarily intended for use when one or more locomotives are driven independently of any cars connected therewith when the automatic brake control electro-pneumatic valves are operated by the microprocessor in response to changes in brake pipe pressure initiated by the brake pipe control circuit in accordance with movement of an automatic brake handle of the brake command controller. There is another high capacity pneumatic relay valve cylinders according to the pressure output (brake pipe pressure of line 92 in FIG. 1).

The electro-pneumatic valves in the brake pipe control circuit 4 and in the locomotive brake cylinder control circuit 6 and 62 are arranged to assume a pressure release state, in the event of a power loss at the microprocessor unit. In consequence of such a power loss, brake pipe pressure is reduced while, concurrently, the locomotive brake cylinder pressure is released.

A pneumatic back-up control valve in the locomotive automatic brake control circuit is provided to establish locomotive brake cylinder pressure in response to the aforementioned reduction of brake pipe pressure resulting from such fail-safe operation of the electro-pneumatic valves in the brake pipe control circuit, there being a double check valve 60 in order to separate the pneumatic backup control valve from such electro-pneumatic valves in the locomotive brake cylinder control circuit.

The pneumatic backup control valve includes a piston valve assembly subject on opposite sides to compressed air in the brake pipe and in the control reservoir. When brake pipe pressure is reduced, the resultant pressure differential forces the piston valve assembly to an application position, wherein the control reservoir air supplies the brake cylinder pilot line to establish the locomotive brake pressure until a force balance is restored across the piston valve assembly. In this manner, the piston valve assembly seeks a lap position in which the supply of brake cylinder pressure is terminated at a value corresponding to the brake pipe pressure reduction in effect.

The locomotive brake cylinder pressure may be released independently of the car brakes by means of a quick release valve associated with the pneumatic backup control valve. A pressure signal supplied to the quick release valve, when a quick release switch is activated, initiates this "bail-off" or quick release function. The brake pipe and control reservoir pressures are communicated via the quick release valve to establish pressure equalization across the piston valve assembly, when the quick release switch is actuated. In this manner, the control reservoir pressure is effectively equalized with the reduced brake pipe pressure, such that a spring force acting on the piston valve assembly, is effective to force the piston valve assembly to release position and the locomotive brake cylinder pressure is exhausted.

In order to reapply the brakes, the quick release switch is deactivated to interrupt communication between the brake pipe and control reservoir pressures via the quick release valve, so that a subsequent reduction of brake pipe pressure is effective to produce a further pressure differential across the piston valve assembly. In response to this further pressure differential, the piston valve assembly will return to the application position and reestablish the supply of control reservoir pressure to the brake cylinder pilot line to reapply the locomotive brake.

In the event of a power failure at the microprocessor, brake pipe pressure is reduced to zero due to the fail-safe configuration of the electro-pneumatic valves in the brake pipe control circuit, which would, therefore, allow the locomotive to be moved without the ability to obtain any automatic locomotive braking whatsoever. The aforementioned U.S. Pat. No. 5,222,788 discloses a circuit modification which provides correction of this shortcoming by providing a microprocessor having a regulated source of electrical power for the control of such first electro-pneumatic valve in accordance with the brake command signal. Additionally, there is a brake assurance arrangement provided for establishing the energized condition of the second electro-pneumatic valve in response to the loss of the regulated source of electrical power.

The aforementioned braking control systems have been provided to address the situations in which a power failure has inactivated such electro-pneumatic valves, in particular those used in the brake control circuit for the independent brake control system 8 illustrated in FIG. 1.

Allowed U.S. patent application Ser. No. 08/380,804 addresses the situation in which the brake pipe control system 4 and the automatic brake control system 6 have been deliberately deactivated based upon the arrangement of the train consist, and an electrical failure occurs in the independent brake control system 8. This system keeps the critical independent braking system operative despite electrical failures affecting the electro-pneumatic valves 68 and 70.

The independent braking system 8 is particularly important since the pressure in control reservoir 72 is critical to the activation of relay valve 82 which in turn regulates pressure to the independent application release brake line 92. Pressure on this brake line is used to develop the control signals of the automatic brake control system 6, including control reservoir 50 which is used to trigger relay valve 62 and thereby control the main brake cylinder 65. Consequently, any failure in any of the aforementioned elements could prove critical to the operability of the train braking system, especially under the circumstances described in the aforementioned braking systems.

While techniques have been developed for failures in the brake control systems (such as 4, 6, and 8), adequate solutions for the failure of a major relay valve (such as 62 or 82) have not been provided in this art.

SUMMARY OF THE INVENTION

The present invention provides a method of operating a microprocessor-controlled braking system. The braking system in which the method operates includes at least one main brake cylinder, a microprocessor, a control handle, a plurality of brake lines and a plurality of brake control circuits where each of the brake control circuits has at least one electro-pneumatic valve. The brake system also includes a plurality of pneumatic relay valves. In the first step of the process, a control handle is operated to generate a first control signal. Using the first control signal, the microprocessor generates at least one second control signal which is applied to the first brake control circuit to adjust pressure in a first control reservoir associated with the first brake control circuit. Next, pressure in a first brake line is adjusted responsive to the pressure in the first control reservoir. The pressure in the first brake line is detected to determine if the brake line pressure is within the predetermined range of values. If the brake line pressure is detected to be outside the predetermined range of values, the first control signal is used as a third control signal which is applied to control the pressure in the main brake cylinder.

In another aspect of the present invention a method is used to operate a braking system that includes at least one main brake cylinder, a control handle and at least one brake line. The process is begun by operating the control handle to generate a first control signal. Responsive to this first control signal pressure in a first brake line is adjusted. Pressure in the first brake line is also detected to determine if the brake line pressure is within a predetermined range of values. A second control signal is generated to control pressure in a main brake cylinder. When the brake line pressure in the first brake line is outside of the predetermined range of values, the first control signal is substituted for the second control signal to control pressure in the main brake cylinder.

A third aspect of the present invention is directed to a braking system including at least one main brake cylinder, a control handle and at least one brake line. This system also includes means for generating a first control signal responsive to operation of the control handle and means for adjusting pressure in a first brake line responsive to the first control signal. This system also includes a sensor arranged to detect for brake line pressure in the first brake line to determine if the brake line pressure is within a predetermined range of values. Also, included are means for generating a second control signal responsive to the pressure in the first brake line, and means for controlling pressure in a main brake cylinder responsive to the second control signal. Finally, the system includes means for substituting the first control signal for the second control signal when the brake line pressure is detected to be outside of the predetermined range of values.

The fourth aspect of the present invention is directed to a method of operating a brake system which includes at least one main brake cylinder and at least one brake line. The method includes the steps of adjusting pressure in a first brake line responsive to an operator-generated control signal, and generating a second control signal responsive thereto. When detecting the brake line pressure in the first brake line is outside a predetermined range of values, the first control signal is substituted for the second control signal to control pressure in the main brake cylinder.

OBJECTS OF THE INVENTION

It is, therefore, one of the primary objects of the present invention to provide a more effective microprocessor-controlled electro-pneumatic locomotive control system which will have incorporated therein a number of important safety features which have been improved.

It is another object of the present invention to provide an operating technique in the event of a failure in a pneumatic relay valve.

It is an additional object of the present invention to provide additional safety features without necessity of additional hardware.

A further object of the present invention is to maintain locomotive brake pressure in the event of major pneumatic relay valve failure.

Still another object of the present invention is to minimize software modifications while establishing enhanced safety features and increasing the reliability of a locomotive braking system.

Still a further object of the present invention is to provide a compensation technique in case of electrical power failure affecting electro-pneumatic valves in an independent braking system.

In addition to the several objects and advantages of the present invention that have been described above, various additional objects and advantages of the invention will become more readily apparent to those persons who are skilled in the railway braking art from the following more detailed description of the invention, particularly, when the description is taken in conjunction with the attached drawings and with the appended claims.

DESCRIPTION OF A PREFERRED EMBODIMENT OF THE INVENTION

Figure 1:
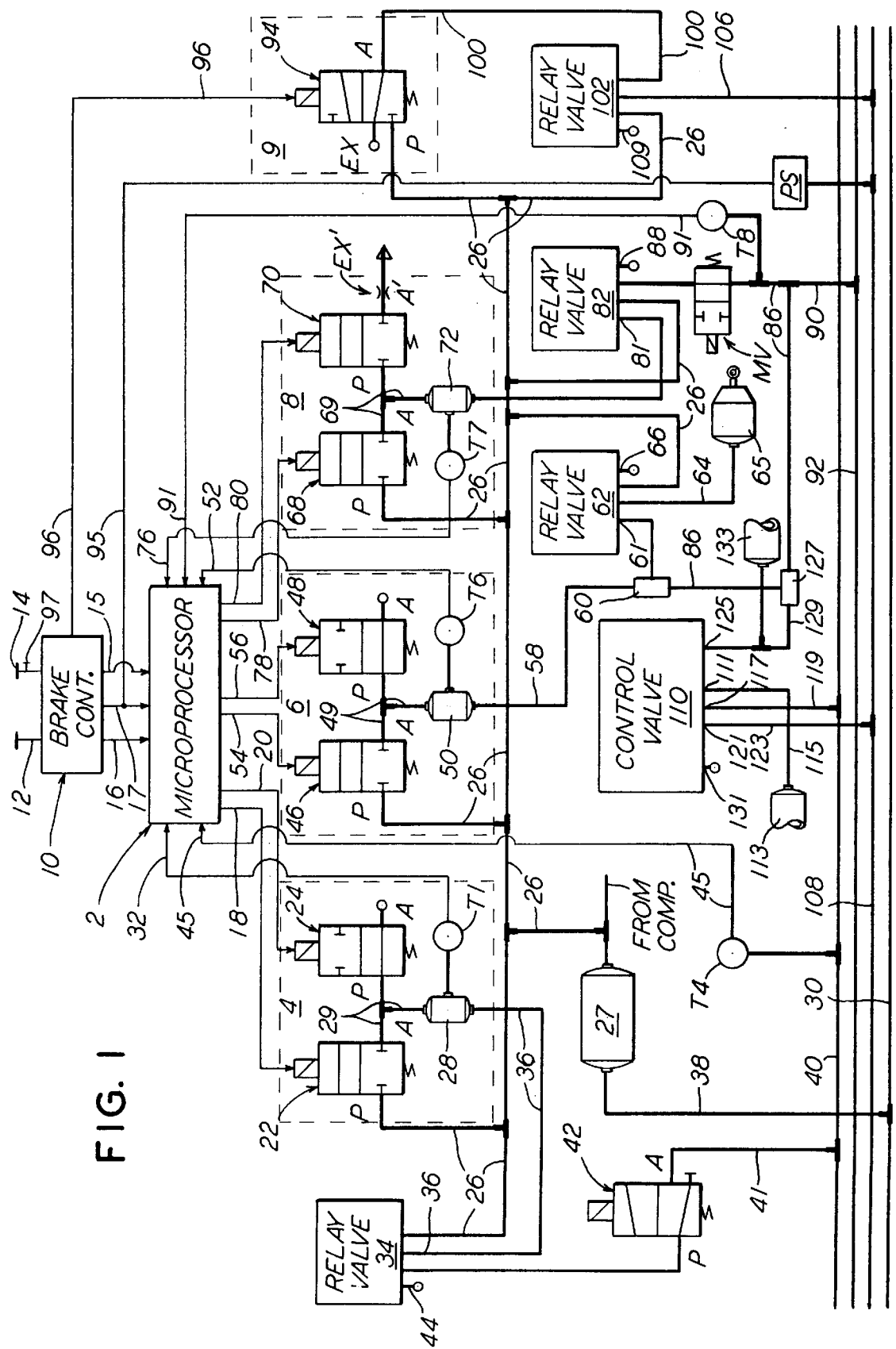
FIG. 1 is a block diagram of an electro-pneumatic brake control system arranged in accordance with this invention.

Referring to FIG. 1, a locomotive electro-pneumatic brake control system is depicted. The brake control system includes a microprocessor, generally designated 2, that controls each of a brake pipe pressure control circuit 4, a locomotive automatic brake control circuit 6, a locomotive independent brake control circuit 8, and a quick release circuit 9. Microprocessor 2 receives input signals from a brake command controller, generally designated 10, having an automatic brake control handle 12 and an independent brake control handle 14.

FIG. 1 is substantially the same as that shown in U.S. Pat. No. 5,503,469, issued April 2, 1996. However, the improvements of that patent application (i.e. the biasing of the electro-pneumatic valves for the independent brake control system and the restricted exhaust ports on the electro-pneumatic valves) are not necessary for the operation of the present invention. Nor is the use of an mw valve as indicated in FIG. 1.

It is noted, the arrangement depicted in FIG. 1 of U.S. Pat. No. 5,192,118 would also be appropriate of the operation of the present invention. FIG. 1 of the drawings merely depicts one braking arrangement in which the present invention can be sustained.

The present invention is directed to the operation of the microprocessor 2 and the programming therein that directs the operation of the other braking system elements. The programming necessary for utilization of the present invention is reflected in the flow chart of FIG. 2 of the present application.

The system of FIG. 1 is described by way of example only, in order to provide an advanced and appropriate environment for the operation of the present invention. However, the environment of the present invention is not limited thereto. For further elaboration of the advanced system supporting the present application, the improvements directed to U.S. Pat. No. 5,503,469 are also described to provide the most complete context available in which the present invention operates.

Manual operation of the automatic brake control handle 12 to one of a plurality of discrete selected positions between brake release and full service positions, respectively, establishes a respective level of brake pipe pressure corresponding to brake release and desired level of pressure application. The incremental handle position selected is converted into a corresponding electrical brake command signal by a suitable encoder, or the like, which is then fed to microprocessor 2 via line 16. Microprocessor 2 responds to receipt of such brake command signal and generates a regulated 24 volt output signal at wires 18 and 20 via which the solenoids of application and release electro-pneumatic valves 22 and 24 are actuated. Application valve 22 and release valve 24 are, preferably, two-way, spring-returned valves, well-known in this art.

Application valve 22 is normally closed and release valve 24 is normally open, the inlet P of application valve 22 being connected by a pipe 26 to a main reservoir 27 to which air is supplied from a compressor (not shown), and the outlet A of release valve 24 acts as a discharge port to the atmosphere. Main reservoir 27 is connected by a pipe 38 to a main reservoir equalizing pipe 30 that is interconnected between the units of a locomotive consist. A control reservoir 28 is connected to a pipe 29 via which outlet A of application valve 22 is connected to inlet P of release valve 24. A pressure transducer T1 monitors the pressure in control reservoir 28 and transmits a corresponding feedback signal to microprocessor 2 via wire 32.

The control port of a high capacity pneumatic relay valve 34 is connected via pipe 36 to control reservoir 28. Relay valve 34 may be a conventional, well known C-2 type relay valve typically employed in the 26 type locomotive brake valves and also in the 30-CW module manufactured by Westinghouse Air Brake Company. Relay valve 34 further includes a supply port that is connected by pipe 26 to main reservoir 27, a delivery port that is connected by a pipe 41 to brake pipe 40, and an exhaust portion 44 that is connected to the atmosphere.

An electro-pneumatic cut-out valve 42 is provided in pipe 41 and has a normally closed position in which its inlet P is cut-off from outlet A. In an open position inlet A communicates with outlet P. Cut-out valve 42 is open on lead units to establish communication between brake pipe 40 and relay valve 34 and closed on train units to interrupt such communication.

Relay valve 34 operates to vary the pressure in train brake pipe 40 in accordance with the pressure in control reservoir 28, supplying air from main reservoir 27 to pipe 41 or releasing air from brake pipe 40 via pipe 41 and exhaust pipe 44. The train brake pipe 40 carries pressure to the cars in the train, the brakes of which are controlled in accordance with variations of brake pipe pressure in a well known manner.

The locomotive automatic brake control circuit 6 is controlled in accordance with either the brake pipe pressure, as monitored by transducer T4, which transmits a corresponding electrical feedback signal via wire 45 to microprocessor 2, and/or independent application and release pipe 92 (also known as a "20 pipe" line.) pressure as monitored by transducer T8, which also transmits a corresponding electrical feedback signal via wire 91 to microprocessor 2. This permits the microprocessor 2 to establish the locomotive brake cylinder pressure.

It is noted for the purposes of the present invention, which is directed to the failure of relay valve 82, "20 pipe" line 92 is monitored (using transducer T8) to determine a different signal between the actual measurements and the desired brake pressure. This difference is used to generate the control signals that operate electro-pneumatic valves 46 and 48. These in turn control the pressure of control reservoir 50 which in turn controls relay valve 62 to provide proper pressure to main brake cylinder 65. Consequently, monitoring of "20 pipe" brake line 92 is considered preferable for the operation of the present invention.

Locomotive automatic brake control circuit 6 consists of a normally closed, two-way, spring-returned, electro-pneumatic application valve 46, a normally open, two-way, spring-returned, electro-pneumatic application valve 48, a control reservoir 50 and a pressure transducer T6. Inlet P of application valve 46 is connected via pipe 26 to main reservoir 27, while outlet A of release valve 48 is connected to the atmosphere. Reservoir 50 is connected between outlet A of application valve 46 and inlet P of release valve 48 via pipe 49. Transducer T6 instantaneously monitors the pressure in reservoir 50 and transmits a corresponding electrical feedback signal to microprocessor 2 via wire 52. The solenoid operators of the respective application and release valves 46 and 48 are connected by wires 54 and 56 to microprocessor 2 which is capable of supplying 24 volts to these control wires under normal operating conditions.

The pressure in control reservoir 50 is regulated by these electro-pneumatic application and release valves 46 and 48 in reverse relationship and at a predetermined relationship relative to brake pipe pressure changes. Reservoir 50 is connected by a pipe 58 to one inlet of a double check valve 60, the outlet of which is connected via pipe 61 to the control port of a high capacity pneumatic relay valve 62. This relay valve 62 may be a well known, standard J-type relay valve device manufactured by Westinghouse Air Brake Company. Relay valve 62 has a supply port that is connected by pipe 26 to main reservoir 27, a delivery port that is connected by pipe 64 to the locomotive brake cylinder device 65, and an exhaust port 66 that is connected to the atmosphere.

Relay valve 62 provides the required high capacity to supply compressed air from main reservoir pipe 26 to brake cylinder device 65, and to release brake cylinder pressure via exhaust port 66, in accordance with the pressure level established in reservoir 50.

The locomotive independent brake control circuit 8 also consists of a pair of solenoid operated, spring returned, two-way, electro-pneumatic valves, specifically, an application valve 68, and a like release valve 70, a control reservoir 72 and a transducer T7. Inlet P of application valve 68 is connected by pipe 26 to main reservoir 27, while outlet A' of release valve 70 is connected to the atmosphere via a restricted orifice EX'.

It is noted that restricted orifice EX' is not necessary for the operation of the present invention, however, this feature facilitates the invention of allowed U.S. patent application Ser. No. 08/380,804 in conjunction with the operation of the present invention. Consequently, while the presence of this feature neither helps nor hinders the operation of the present application, its presence as part of a system to prevent inadvertent discharge of pipe pressure benefits the overall system supporting the present invention.

Reservoir 72 is interconnected between outlet A of application valve 68 and inlet P of release valve 70 via pipe 69. Transducer T7 instantaneously monitors the pressure present in reservoir 72 and transmits a corresponding electrical feedback signal to microprocessor 2 via wire 76. Pursuant to prior art practices, application and release valves 68 and 70 are normally closed, when their respective 24 volt solenoid operators are de-energized through microprocessor 2 by connected wires 78 and 90.

Pursuant to the invention of U.S. Pat. No. 5,503,469, however, release valve 70 is biased to be normally open, so that in the event of a power failure, pressure is vented from the control chamber and reservoir 72, so that the relay valve will vent the air pressure from the locomotive brake cylinders.

Independent brake control handle 14 of controller 10 generates an electrical brake command signal that is transmitted to microprocessor 2 via wire 15 according to the selected position of handle 14 in a manner substantially the same as that for controlling the automatic application and release valve solenoids in the brake pipe control circuit 4 as described above. A pipe 81 is connected between reservoir 72 and the control port of a relay valve 82, such as a J-type relay valve device as utilized in automatic brake control circuit 6 described above. This relay valve 82 further includes a supply port that is connected by pipe 26 to main reservoir 27, a delivery port that is connected by pipe 86 to the control port of relay valve 62 via the other inlet of double check valve 60 and pipe 61, and an exhaust port 88 that is connected to the atmosphere. A branch pipe 90, of pipe 86, is connected to an independent application and release pipe ("20 pipe") 92 which is interconnected between the respective cars of the locomotive consist. Relay valve 82 provides the high capacity air requirement for pipe 92.

Quick release control circuit 9 includes a solenoid operated, spring returned, three-way, electro-pneumatic quick release valve 94, the solenoid of which is connected by wire 96 to brake controller 10 to provide a quick release signal when a manually operable, quick release switch 97 is actuated. Preferably, this quick release switch 97 is incorporated in independent brake control handle 14 in such a way as to permit the operator to actuate the quick release switch 97, while at the same time manipulate the handle 14 for independent brake control.

Quick release valve 94 includes an inlet P that is connected by a pipe 26 to main reservoir 27, an outlet EX that is connected to the atmosphere and an outlet A that is connected by a pipe 100 to the control port of a high capacity pneumatic relay valve 102. The relay valve 102 further includes a supply port to which main reservoir 27 is connected by pipe 26, a delivery port connected by pipe 106 to an actuating pipe 108, and an exhaust port 109 connected to the atmosphere. Relay valve 102 may also be a well known J-type relay valve device, and is provided to handle the high capacity air requirement of actuating pipe 108, which runs through the locomotive consist.

Associated with quick release circuit 9 is a pressure switch PS that is connected to actuating pipe 108 in order to provide an electrical signal to microprocessor 2 via wire 95 indicative of a quick release operation being initiated on a lead locomotive. This signal provides the means by which a trailing locomotive automatic brake application may be quick released in conjunction with release of the lead locomotive automatic brake application when the quick release switch 97 is actuated on the lead locomotive.

Independent brake control circuit 8 is normally operated by movement of independent brake control handle 14 of brake controller 10 at the lead or controlling locomotive from a release position to an application position, the degree of application corresponding to the position of handle 14 in a brake application zone between release and full application positions. Movement of handle 14 to an application position, either from release position or from a lower application position within the application zone, is converted to provide a brake control signal at wire 15, the signal being greater than the signal prior to such movement of handle 14, as reflected by the feedback signal from transducer T7 effective at wire 76. The polarity of the difference between these signals prompts microprocessor 2 to energize wire 78 and de-energize wire 80. Application valve 68 of independent control circuit 8 is thus operated to its open position in which inlet P is connected to outlet A, and release valve 70 is operated to its closed position in which inlet P is cut-off from outlet A'. Pressure in main reservoir 27 is thus supplied to control reservoir 72 via pipe 26, the open application valve 68 and pipe 69 until such time as the control reservoir pressure, as monitored by transducer T7 builds up to a value corresponding to the selected position of handle 14. When this occurs, the electrical signal at wire 15 and feedback wire 76 will be substantially the same to cause microprocessor 2 to de-energize wire 78 and energize wire 80. This in turn causes application and release valves 68 and 70 to assume a closed position, in which further supply and release of pressure in control reservoir 72 is withheld until such time as a further difference signal develops between brake command wire 15 and feedback wire 76. The polarity of such a difference signal determines whether the control reservoir 72 pressure increases further or decreases.

Pressure in control reservoir 72 is effective at the control port of relay valve 82, which is turn supplies air from main reservoir 27 to double check valve 127 via pipes 26 and 86. In the absence of a brake application via either the automatic locomotive brake control circuit 6 or back-up control valve device 112, the independent brake control pressure in pipe 86 will pass through the double check valve 127 and double check valve 60 to operate relay valve 62 and accordingly control the pressure delivered to the locomotive brake cylinders 65. Even if the locomotive brake cylinder pressure is applied through the automatic brake control circuit at some value less than that required at the full service state, the independent brake control circuit can provide higher brake cylinder pressure at the locomotive independently of the car brakes throughout the train.

This independently controlled locomotive brake pressure is also connected from pipe 86, of relay valve 82, to pipe 90 leading to independent application and release pipe 92 to transmit the independent brake control pressure to a trailing locomotive or locomotives. The independent brake control pressure is limited to a maximum value that is compatible with locomotive brake control equipment that employs multiplying relay valves, such as the standard 26-L type. Transducer T8 converts the independent brake control pressure to a corresponding electrical feedback signal that is connected via wire 91 to microprocessor 2. The microprocessor 2 is programmed to multiply this feedback signal of the independent brake control pressure and to control the locomotive brake pressure through electro-pneumatic valves 46 and 48 of the locomotive automatic brake control circuit 6 to obtain the desired independent brake control pressure, whether the locomotive is connected for lead or trail operating status. Electro-pneumatic valves 46 and 48 are energized until the feedback signal from transducer T6 to microprocessor 2 via wire 52 corresponds to the feedback signal via wire 91, at which point each of such electro-pneumatic valves 46 and 48 will assume a lap condition. In the event locomotive brake cylinder pressure is already present at the time the independent brake is applied, the microprocessor will only be effective to increase the locomotive brake cylinder pressure to the extent of the independent brake control signal and the above-mentioned multiplication factor for which the microprocessor is programmed.

Consequently, the feedback signal that is compared to the brake control signal is critical to the proper operation of the overall braking control system. As a result, the braking control system is vulnerable to any condition that prevents the "20 pipe" pressure in line 92 from being measured for the feedback signals. One such condition that would prevent the pressure in "20 pipe" line 92 from being measured is the failure of relay valve 82. However, other unwanted conditions can arise that would also lead to a failure to detect the pressure in "20 pipe" line 92. The present invention is directed to any such contingencies, and is designed to ensure that the appropriate control signal would be generated from microprocessor 2 to adjust the pressure in control reservoir 50 thereby controlling relay valve 62 to provide proper pressure to brake cylinder 65.

The present invention provides these benefits by virtue of programming microprocessor 2 to substitute the independent brake control signal as generated from brake control unit 10 for the signal that is normally derived from the difference between the brake control signal and the feedback signal from transducer T8. This substituted brake control signal is used to activate electro-pneumatic valves 46 and 48 to continue to provide the proper control pressure (via the control reservoir 50) to relay valve 62 so that proper pressure is applied to brake cylinder 65. The conditions necessary for this substitution to occur are constituted by failure to receive pressure measurements from the "20 pipe" line 92 for a predetermined amount of time. Once these conditions are satisfied, the substitution will take place to prevent failure of pressure provisions to brake cylinder 65.

Figure 2A:
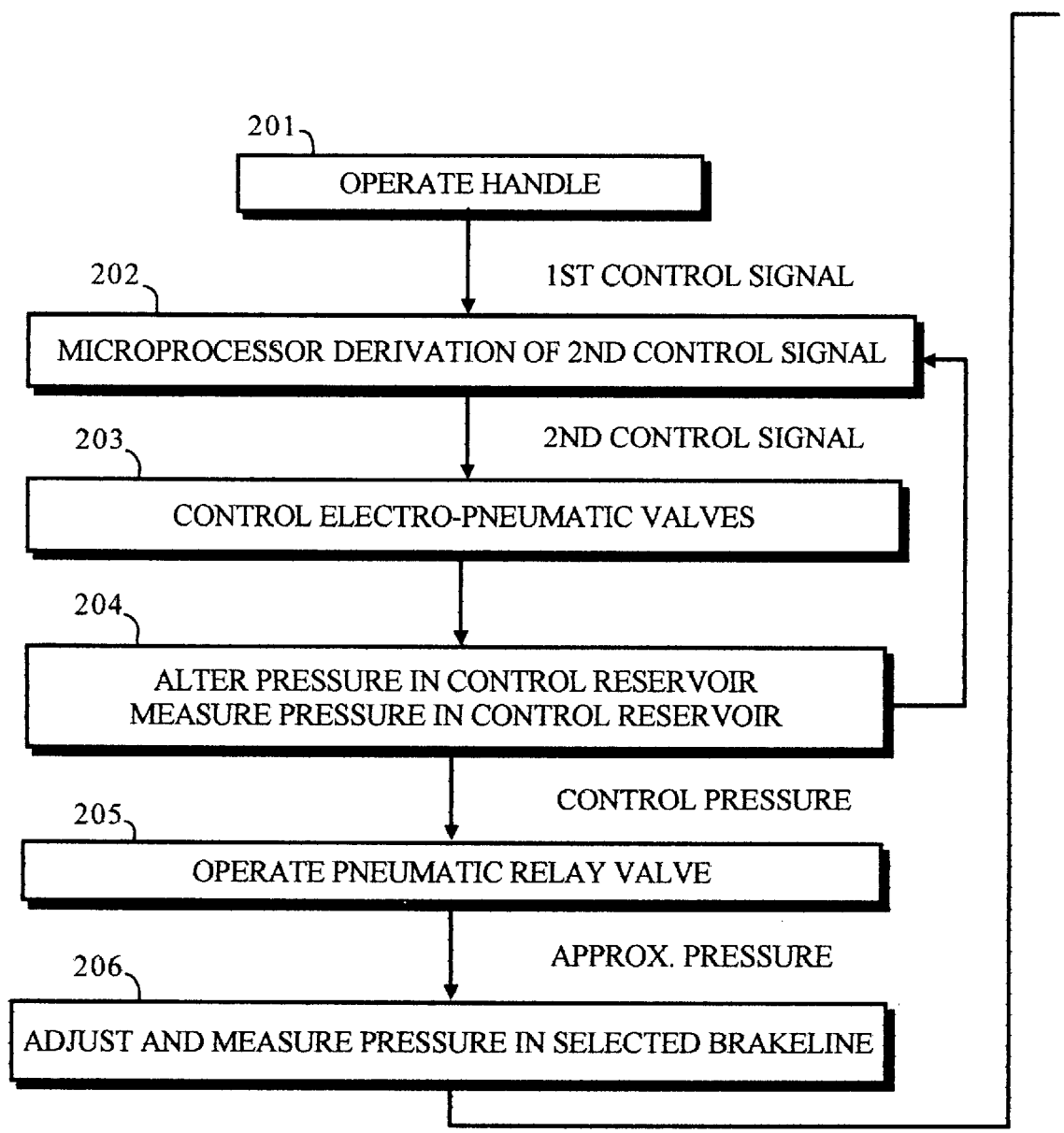
FIG. 2 is a flow chart depicting the functionality of the present invention.
Figure 2B:
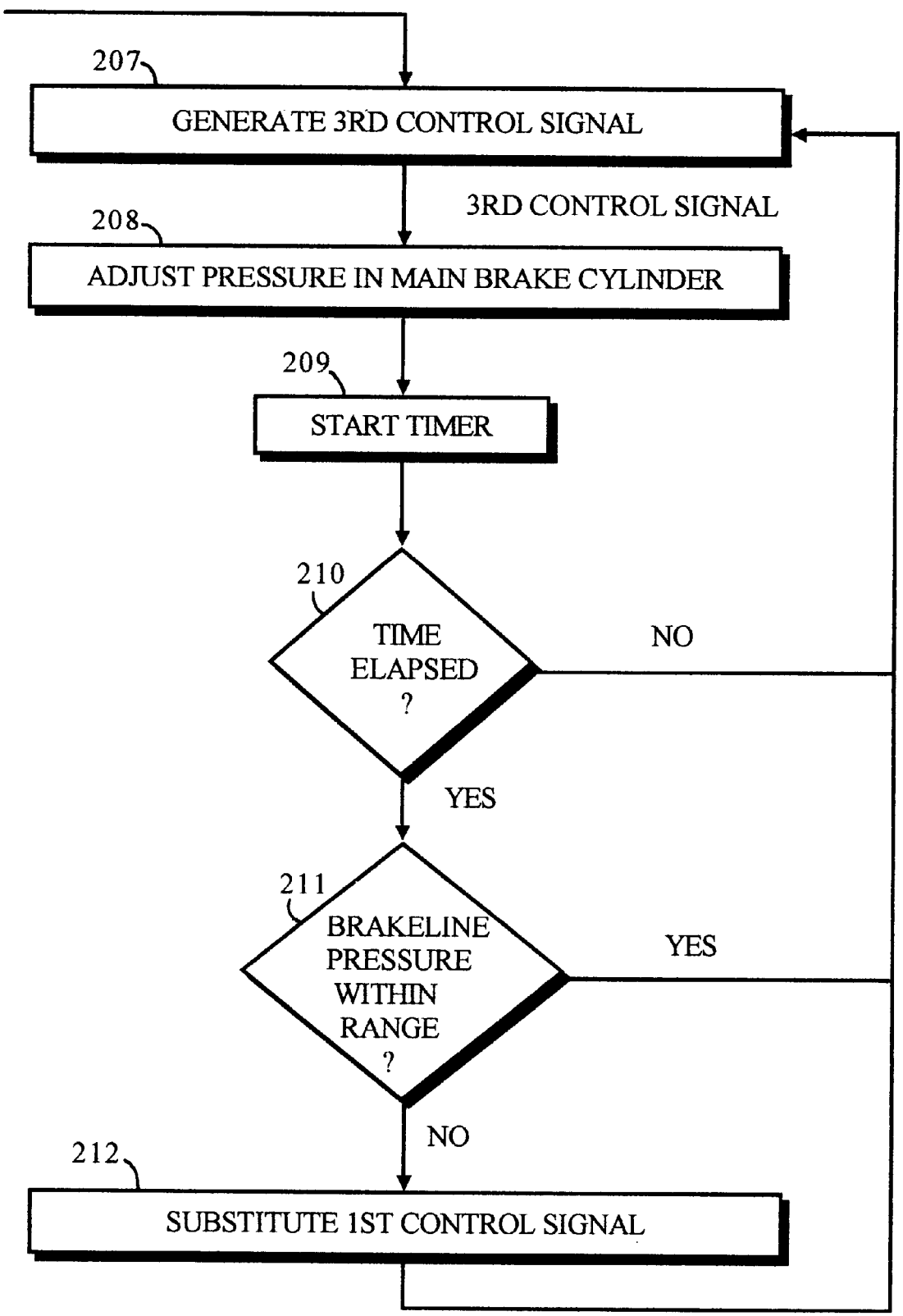

The overall operation of the system with respect to controlling pressure to the brake cylinder and its modification in accordance with the present invention is depicted in FIG. 2. As with any braking operation the process is initiated by the operation of a manual brake control handle, in this case control handle 14 used for the independent brake control system 8. This operation is carried out at step 201 and results in a first control signal to be sent to microprocessor 2.

At step 202 microprocessor 2 derives a second control signal based upon the first control signal and other signal values derived from a feedback process. The result is the previously described second control signal that is essentially a different signal to be applied to the selected electro-pneumatic valves 68 and 70 of the independent brake control circuit 8. As previously described, the value and the "sign" of the resulting signal value will determine the precise operation of these two electro-pneumatic valves. The operation of these valves is described supra in this application, and takes place at step 203 as depicted in FIG. 2.

The resulting operation of the valves at step 203 will determine the pressure to be applied to control reservoir 72 as indicated at step 204. At the same step, the pressure in the control reservoir is measured by transducer T7. The results of this measurement are sent back to microprocessor 2, as indicated by the feedback loop between steps 204 and 202 in FIG. 2. This feedback signal provides one of the signals necessary to derive a difference signal that is used to produce the second control signal. As a result of controlling the pressure in the control reservoir 72, a control pressure is provided via control port 81 to relay valve 82 to initiate operation of this valve as depicted in step 205. Relay valve 82 operates to apply pressure from the main reservoir, via line 26 to "20 pipe" line 92.

At step 206 the operation of relay valve 82 provides the predetermined amount of pressure to "20 pipe" line 92. To ensure the proper pressure, the pressure in line 92 is measured by sensor T8. The signal representing the value of the measured pressure is sent back to microprocessor 2 to be incorporated in the calculation of the control signals that will operate automatic braking control circuit 6.

At step 207 microprocessor 2 generates the third control signal. This signal is preferably the result of a comparison of a measured signal and a signal indicative of a desired pressure. In particular, the pressure control reservoir 50 is measured by sensor T6 for this comparison. The resulting control signal (designed as the third control signal) is used as previously described to control operation of the two electro-pneumatic valves 46 and 48. This operation adjusts the pressure in control reservoir 50 to provide control pressure to relay valve 62 which in turn provides the correct pressure to brake cylinder 65 as depicted in step 208.

A key feature of the present invention is the use of a timer that begins timing when the detection "20 pipe" line 92 is first carried out. The timer function is in operation while the third control signal is being generated and the pressure in the main brake cylinder 65 is also being adjusted. During this time the system continues to rely upon readings from "20 pipe" line 92 as obtained by sensor T8. This will continue during the time duration specified in the timer function and can be altered only after the duration of the timer function occurs. The use of the timer operation is novel to the present invention. However, the implementation of this function is not difficult since microprocessor 2 like virtually all modern programmable microprocessors has an easily operated timing function. Thus, one skilled in this art could easily program microprocessor 2 as instructed by the present application. The duration of the timing function depends upon all the other system perimeters, and would be selected dependent upon a reasonable time to be allowed for inappropriate pressure reads from line 92. An alternative value to the pressure readings provided by sensor T8 would be desirable before the proper pressure level in brake cylinder 65 could be compromised.

At step 210 the second condition required by the operation of the present invention is evoked. The brake line pressure (in this case at "20 pipe" line 92) must be within prescribed range of values. More particularly, this value could be required to be substantially the same as the value received from brake controller 10 (the first control signal.), as provided by manual control 14.

Consequently, two determinations must be made in the operation of the present invention. At step 210, the determination must be whether the predetermined time duration has elapsed. As previously stated if the predetermined time period has not elapsed, the system will continue to rely upon the measurements provided by sensor T8 regardless of the values or efficacy of those measurements. However, once the time duration has elapsed, a second test is carried out. The measurements provided by sensor T8 are evaluated to determine if they are within the predetermined range of values. If so, the microprocessor 2 continues to use these measurements in the generation of third control signal to operate electro-pneumatic valves 46 and 48. If on the other hand, as is indicated at step 211, the measurements provided by sensors T8 do not reflect appropriate pressure values, a determination is made that malfunction has occurred, and that the pressure in "20 pipe" line 92 has been compromised. As a result, this line cannot be relied upon as a determinate for adjusting the pressure in brake cylinder 65.

Once this determination has been made, the substitution step as depicted at 212 in FIG. 2, is carried out by microprocessor 2. When this occurs, the first control signal (as generated by brake controller 10) is used instead of the difference signal derived from the difference between the feedback signal from sensor T8 and the brake control signal derived from brake controller 10. As a result, it is possible for the desired pressure level to be recognized immediately by microprocessor 2 so that the correct adjustments can be made in automatic brake control circuit 6 to control relay valve 62 to apply the correct pressure to brake cylinder 65. This substitution is represented by the feedback loop running from steps 212 to 207 in the FIG. 2 flowchart.

While one embodiment of the many inventive aspects of this invention has been described above, it should be apparent that any one of the aspects, or combinations of the various aspects, could be utilized without departing from the spirit of the invention. For example, the independent brake control signal from brake controller 10 need not be used. Rather, another preprogrammed value can be selected by the microprocessor 2 when the dual test of steps 210 and 211 (as depicted in FIG. 2) have indicated that substitution of a preprogrammed value should take place. Such a value may be more appropriate for conditions under which it is assumed that relay valve 82 or "20 pipe" line 92 have failed. Further, the system of the present invention can be used without the mu valve. However, the system of the present invention can also include the mu valve as operated in both U.S. Pat. No. 5,192,118, and as modified in U.S. Pat. No. 5,503,469. Clearly, other embodiments and modifications could be utilized without departing from the spirit of the present invention as exemplified in FIG. 2 of this application.

We claim:

1. A method of operating a microprocessor-controlled braking system that includes at least one main brake cylinder, a microprocessor, a control handle, a plurality of brake lines, a plurality of brake control circuits inclusive of a 20 pipe brake control circuit, where each of said brake control circuits has at least one electro-pneumatic valve, and a plurality of pneumatic relay valves, said method comprising the steps of:

(a) operating said control handle to generate a first control signal;

(b) generating at said microprocessor at least one second control signal responsive to said first control signal;

(c) applying said at least one second control signal to said 20 pipe brake control circuit to adjust pressure in a first control reservoir associated with said 20 pipe brake control circuit;

(d) detecting pressure at said first control reservoir;

(e) generating at least one subsequent second control signal based on a difference signal derived from a comparison of said first control signal and said detected pressure at said first control reservoir;

(f) adjusting pressure in a first of said plurality of brake lines responsive to said pressure in said first control reservoir;

(g) detecting for line pressure in said first brake line to determine if said brake line pressure is within a predetermined range of values;

(h) activating a timer for a predetermined time duration upon said step (g) being carried out;

(i) after said predetermined time duration, when detecting that said brake line pressure in said first brake line is (A) outside said predetermined range of values, using said first control signal as a third control signal and (B) within said predetermined range of values, using a second difference signal as said third control signal; and, (j) controlling pressure in said main brake cylinder responsive to said third control signal.

2. The method of claim 1, wherein step (c) further comprises the substep of (iii) adjusting two electro-pneumatic valves.

3. The method of claim 1, wherein step (f) comprises adjusting a first pneumatic relay valve responsive to pressure in said first control reservoir.

4. The method of claim 3, wherein step (j) comprises controlling a second pneumatic relay valve responsive to pressure in a second control reservoir.

5. The method of claim 4, wherein pressure in said second control reservoir is controlled responsive to said third control signal.

6. The method of claim 3, wherein first brake line pressure in said first brake line is detected to be outside said predetermined range of values responsive to failure of said first pneumatic relay valve.

7. The method of claim 1, wherein said plurality of brake lines are arranged along a plurality of railroad cars.

8. The method of claim 7, wherein said plurality of brake lines are arranged along a plurality of railroad locomotives.

9. The method of claim 8, wherein said first brake line is constituted by an independent application and release brake line.

10. The method of claim 1, wherein said different signal results from a comparison of said first control signal and said detected pressure in said first brake line.

* * * * *